(12) United States Patent
Shimazaki et al.

(10) Patent No.: US 11,203,674 B2
(45) Date of Patent: Dec. 21, 2021

(54) TRANSPARENT FILM

(71) Applicants: SUMITOMO CHEMICAL COMPANY, LIMITED, Tokyo (JP); NATIONAL INSTITUTE OF ADVANCED INDUSTRIAL SCIENCE AND TECHNOLOGY, Tokyo (JP)

(72) Inventors: Yasuharu Shimazaki, Osaka (JP); Yoshihiro Harada, Osaka (JP); Ryu Takeko, Osaka (JP); Atsushi Hozumi, Nagoya (JP); Chihiro Urata, Nagoya (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/522,626

(22) PCT Filed: Oct. 27, 2015

(86) PCT No.: PCT/JP2015/080209
§ 371 (c)(1),
(2) Date: Apr. 27, 2017

(87) PCT Pub. No.: WO2016/068118
PCT Pub. Date: Jun. 5, 2016

(65) Prior Publication Data
US 2017/0313833 A1 Nov. 2, 2017

(30) Foreign Application Priority Data

Oct. 31, 2014 (JP) .............................. JP2014-223648

(51) Int. Cl.
| | | |
|---|---|---|
| *C08J 5/18* | (2006.01) | |
| *C08G 77/04* | (2006.01) | |
| *C09D 183/04* | (2006.01) | |
| *B32B 27/00* | (2006.01) | |
| *C09D 183/06* | (2006.01) | |
| *C08G 77/14* | (2006.01) | |
| *C09D 4/00* | (2006.01) | |

(52) U.S. Cl.
CPC ................ *C08J 5/18* (2013.01); *B32B 27/00* (2013.01); *C08G 77/04* (2013.01); *C08G 77/14* (2013.01); *C09D 183/04* (2013.01); *C09D 183/06* (2013.01); *B32B 2307/412* (2013.01); *B32B 2307/536* (2013.01); *B32B 2307/73* (2013.01); *C08J 2383/04* (2013.01); *C08J 2385/00* (2013.01); *C09D 4/00* (2013.01)

(58) Field of Classification Search
CPC ........ C08G 77/04; C08G 77/12; C08G 77/14; C08G 77/16; C08G 77/18; C09D 183/04; C09D 183/06; C08J 2383/04; C08J 2383/06; B32B 2307/73; B32B 2307/412; B32B 2307/536
See application file for complete search history.

(56) References Cited

U.S. PATENT DOCUMENTS

| | | | |
|---|---|---|---|
| 2,397,895 | A | 4/1946 | Warrick |
| 3,450,672 | A | 6/1969 | Merrill |
| 3,634,321 | A | 1/1972 | Nugent et al. |
| 4,322,476 | A | 3/1982 | Molari, Jr. |
| 4,895,286 | A | 1/1990 | Derosa |
| 5,359,109 | A | 10/1994 | Ritscher et al. |
| 6,511,753 | B1 * | 1/2003 | Teranishi ................. C09D 4/00 106/287.16 |
| 7,351,477 | B2 | 4/2008 | Yamaya et al. |
| 7,785,715 | B2 | 8/2010 | Tsumura et al. |
| 2002/0015800 | A1 | 2/2002 | Miyamoto et al. |
| 2002/0064663 | A1 | 5/2002 | Murphy et al. |
| 2004/0076840 | A1 | 4/2004 | Akamatsu et al. |
| 2004/0152825 | A1 | 8/2004 | Yamamoto et al. |
| 2005/0227092 | A1 | 10/2005 | Yamaya et al. |
| 2007/0009657 | A1 | 1/2007 | Zhang et al. |
| 2007/0053062 | A1 | 3/2007 | Sasaki et al. |
| 2007/0141305 | A1 | 6/2007 | Kasai et al. |
| 2008/0064814 | A1 | 3/2008 | Yamamoto et al. |
| 2008/0090004 | A1 | 4/2008 | Zhang et al. |
| 2011/0117344 | A1 | 5/2011 | Chen et al. |
| 2011/0165808 | A1 | 7/2011 | Zimmermann et al. |
| 2013/0340992 | A1 | 12/2013 | Akinaga et al. |
| 2015/0021643 | A1 | 1/2015 | Kurino et al. |
| 2015/0118502 | A1 | 4/2015 | Mitsuhashi et al. |

(Continued)

FOREIGN PATENT DOCUMENTS

| | | |
|---|---|---|
| CN | 103443223 A | 12/2013 |
| EP | 0565743 A1 | 10/1993 |

(Continued)

OTHER PUBLICATIONS

US Office Action for U.S. Appl. No. 15/522,584, dated Jun. 15, 2018.

(Continued)

*Primary Examiner* — Jasper Saberi

(74) *Attorney, Agent, or Firm* — Birch, Stewart, Kolasch & Birch, LLP.

(57) ABSTRACT

The object of the present invention is to attain both water/oil repellency and hardness. The transparent film of the present invention comprises: a polysiloxane backbone; and a first hydrocarbon chain-containing group bonded to a part of silicon atoms forcing the polysiloxane backbone, wherein the thickness of the transparent film is not less than 6 nm and not more than 50 nm.

6 Claims, No Drawings

(56) References Cited

U.S. PATENT DOCUMENTS

| | | | | |
|---|---|---|---|---|
| 2016/0032146 A1* | 2/2016 | Hozumi | ............... | C09D 183/04 528/39 |
| 2017/0015842 A1 | 1/2017 | Hozumi et al. | | |

FOREIGN PATENT DOCUMENTS

| | | | |
|---|---|---|---|
| JP | 5-148451 | A | 6/1993 |
| JP | 6-32991 | A | 2/1994 |
| JP | 7-48560 | A | 2/1995 |
| JP | 7-161453 | A | 6/1995 |
| JP | 7-179480 | A | 7/1995 |
| JP | 9-157636 | A | 6/1997 |
| JP | 9-309889 | A | 12/1997 |
| JP | 10-326559 | A | 12/1998 |
| JP | 11-92714 | A | 4/1999 |
| JP | 11-218926 | A | 8/1999 |
| JP | 2000-17229 | A | 1/2000 |
| JP | 2000-80354 | A | 3/2000 |
| JP | 2000-182513 | A | 6/2000 |
| JP | 2000-195415 | A | 7/2000 |
| JP | 2002-256258 | A | 9/2002 |
| JP | 2004-122106 | A | 4/2004 |
| JP | 2005-120236 | A | 5/2005 |
| JP | 2008-96516 | A | 4/2008 |
| JP | 2008-137858 | A | 6/2008 |
| JP | 2009-521551 | A | 6/2009 |
| JP | 2010-222703 | A | 10/2010 |
| JP | 2010-248468 | A | 11/2010 |
| JP | 2011-111509 | A | 6/2011 |
| JP | 2011-174001 | A | 9/2011 |
| JP | 2012-17394 | A | 1/2012 |
| JP | 2012-46765 | A | 3/2012 |
| JP | 2012-214588 | A | 11/2012 |
| JP | 2013-155375 | A | 8/2013 |
| JP | 2013-173939 | A | 9/2013 |
| JP | 2013-213181 | A | 10/2013 |
| JP | 2013-222836 | A | 10/2013 |
| JP | 2013-249389 | A | 12/2013 |
| JP | 2014-15609 | A | 1/2014 |
| JP | 2014-37548 | A | 2/2014 |
| JP | 5472543 | B2 | 4/2014 |
| JP | 2014-76924 | A | 5/2014 |
| JP | 2014-185334 | A | 10/2014 |
| KR | 10-2006-0045524 | A | 5/2006 |
| TW | 201414769 | A | 4/2014 |
| WO | WO 2010/074264 | A1 | 7/2010 |
| WO | WO 2012/137976 | A1 | 10/2012 |
| WO | WO 2013/187432 | A | 12/2013 |

OTHER PUBLICATIONS

International Search Report, issued in PCT/JP2015/080209 (PCT/ISA/210), dated Jan. 19, 2016.
International Search Report (Form PCT/ISA/210) for International Application No. PCT/JP2015/080176, dated Jan. 19, 2016.
Park et al., "Long Perfluoroalkyl Chains are not Required for Dynamically Oleophobic Surfaces," Green Chemistry, vol. 15, 2013, pp. 100-104.
Urata et al., "How to Reduce Resistance to Movement of Alkane Liquid Drops Across Tilted Surfaces Without Relying on Surface Roughening and Perfluorination," Langmuir, vol. 28, Nov. 30, 2012, pp. 17681-17689.
Urata et al., "Smooth, Transparent and Nonperfluorinated Surfaces Exhibiting Unusual Contact Angle Behavior Toward Organic Liquids," RSC Advances, vol. 2, 2012, pp. 9805-9808.
Urata et al., "Unusual Dynamic Dewetting Behavior of Smooth Perfluorinated Hybrid Films: Potential Advantages over Conventional Textured and Liquid-Infused Perfluorinated Surfaces," Langmuir, vol. 29, Sep. 11, 2013, pp. 12472-12482.
Urata et al., "Why Can Organic Liquids Move Easily on Smooth Alkyl-Terminated Surfaces?" Langmuir, vol. 30, Mar. 24, 2014, pp. 4049-4055.

Taiwanese Office Action and Search Report dated Mar. 5, 2019 for Application No. 104136832, with an English translation.
Taiwanese Office Action and Search Report, dated Apr. 12, 2019, for Taiwanese Application No. 104135378, with an English translation.
Taiwanese Office Action and Search Report, dated Apr. 23, 2019, for Taiwanese Application No. 104135384, with an English translation.
Taiwanese Office Action and Search Report, dated Apr. 8, 2019, for Taiwanese Application No. 104135377, with an English translation.
AIST, "Transparent Coating Film Excellent in Oil Repellency," URL: http://www.aist.go.jp/aist_j/press_release/pr2012/pr20120313/pr20120313.html, Mar. 13, 2012, 5 pages, with partial English translation.
Chinese Office Action and Search Report for Chinese Application No. 201580059039.3, dated Nov. 1, 2018, with English translation of the Office Action.
Chinese Office Action and Search Report for Chinese Application No. 201580059081.5, dated Oct. 24, 2018, with English translation of the Office Action.
Chinese Office Action and Search Report for Chinese Application No. 201580059125.4, dated Nov. 29, 2018, with English translation of the Office Action.
Chinese Office Action and Search Report for Chinese Application No. 201580060808.1, dated Oct. 31, 2018, with English translation of the Office Action.
Chinese Office Action and Search Report for Chinese Application No. 201580061118.8, dated Nov. 29, 2018, with English translation of the Office Action.
Chinese Office Action for Chinese Application No. 201580009221.8, dated Apr. 12, 2017, with English translation.
Extended European Search Report for European Application No. 15751325.0, dated Dec. 9, 2016.
Gao et al., "Contact Angle Hysteresis Explained," Langmuir, vol. 22, No. 14, 2006 (published online Jun. 3, 2006), pp. 6234-6237.
International Search Report (Form PCT/ISA/210) for International Application No. PCT/JP2015/054626, dated May 26, 2015.
International Search Report (Form PCT/ISA/210) for International Application No. PCT/JP2015/080264, dated Jan. 19, 2016.
International Search Report (Form PCT/ISA/210) for International Application No. PCT/JP2015/081422, dated Jan. 19, 2016.
International Search Report (Form PCT/ISA/210) for International Application No. PCT/JP2015/081504, dated Jan. 19, 2016.
Japanese Office Action for Japanese Application No. 2014-032316, dated Mar. 13, 2018, with English translation.
Korean Office Action for Korean Application No. 10-2016-7025075, dated Dec. 13, 2017, with English translation.
Synquest Laboratories, "(3,3,3-Trifluoropropyl)dimethylchlorosilane," Product Sheet, URL: http://www.synquestlabs.com/product/id/27794.html, Date Unknown, 1 page.
U.S. Office Action for U.S. Appl. No. 15/119,437, dated Feb. 6, 2018.
U.S. Office Action for U.S. Appl. No. 15/119,437, dated Jun. 6, 2018.
U.S. Office Action for U.S. Appl. No. 15/525,177, dated Jun. 20, 2018.
U.S. Office Action for U.S. Appl. No. 15/525,188, dated Oct. 5, 2018.
Taiwanese Office Action and Search Report for Taiwanese Application No. 104136831, dated Jun. 13, 2019, with English translation.
Chinese Office Action and Search Report dated Jul. 16, 2019 for Application No. 201580059039.3, along with an English translation of the Office Action.
Japanese Office Action for Japanese Application No. 2016-556570, dated Sep. 10, 2019, with English translation.
Japanese Office Action for Japanese Application No. 2016-556576, dated Sep. 10, 2019, with English translation.
Japanese Office Action for Japanese Application No. 2016-556583, dated Sep. 10, 2019, with English translation.
Japanese Office Action for Japanese Application No. 2016-559029, dated Sep. 10, 2019, with English translation.
Japanese Office Action for Japanese Application No. 2016-559042, dated Sep. 10, 2019, with English translation.

(56) References Cited

OTHER PUBLICATIONS

Chinese Office Action for Chinese Application No. 201580059125.4, dated Oct. 24, 2019, with English translation.
Chinese Office Action for Chinese Application No. 201580061118.8, dated Oct. 24, 2019, with English translation.
Chinese Office Action for Chinese Application No. 201580059039.3, dated Feb. 21, 2020, with an English translation.
Japanese Office Action, dated Apr. 28, 2020, for Japanese Applcation No. 2016-559042, along with an English translation.
Taiwanese Office Action, dated Mar. 31, 2020, for Taiwanese Application No. 164136831, along with an English translation.
Chinese Office Action for Chinese Application No. 201580059125.4, dated May 19, 2020, with English translation of the Office Action.
Chinese Office Action for Chinese Application No. 201580061118.8, dated May 19, 2020, with English translation of the Office Action.
Chinese Office Action for Chinese Application No. 201580059039.3, dated Nov. 9, 2020, with an English translation.
Chinese Office Action for Chinese Application No. 201580059125.4, dated Dec. 1, 2020, with an English translation.

* cited by examiner

TRANSPARENT FILM

FIELD

The present invention relates to a transparent film capable of imparting water/oil repellency to various kinds of substrates.

BACKGROUND ART

In various kinds of display devices, optical elements, semiconductor elements, building materials, automobile components, nanoimprint techniques and solar cell members, deposition of liquid droplets on a surface of a substrate may cause a problem of contamination and corrosion of the substrate, or further the deterioration in the performance due to the contamination and corrosion. Therefore, in these fields, the substrate surface is required to have good water/oil repellency. Particularly, it is required not only the prevention of deposition of liquid droplets on the base material surface, but also the ease of removing deposited liquid droplets.

There have been made efforts to control a solid surface for the dynamic behaviors of liquid droplets on the solid surface in order to remove the deposited liquid droplets. Patent Document 1 suggests a film obtained by co-hydrolysis/condensation polymerization of an organosilane and a metal alkoxide in a solution containing an organic solvent, water and a catalyst.

PRIOR ART DOCUMENTS

Patent Documents

Patent document 1: JP 2013-213181 A

SUMMARY OF THE INVENTION

Problems to be Solved by the Invention

The present inventors found that the hardness of the film in Cited Document 1 sometimes lacks film hardness. When the film hardness is insufficient, liquid droplets may be easily deposited, or hardly removed, which results in the problem of contamination or corrosion of a substrate, or further deterioration in the performance. The object of the present invention is to attain both water/oil repellency and hardness.

Solutions to the Problems

The present inventors extensively studied in view of the situations described above, and resultantly found that when the transparent film thickness is decreases, hardness is unexpectedly improved, and thus the transparent film attains both water/oil repellency and hardness, thereby leading to the completion of the present invention.

The transparent film of the present invention comprises:
a polysiloxane backbone; and
a first hydrocarbon chain-containing group bonded to a part of silicon atoms forming the polysiloxane backbone,
wherein the thickness of the transparent film is not less than 6 nm and not more than 50 nm.

The thickness of the transparent film of the present invention is preferably not less than 8 nm and not more than 40 nm.

The transparent film of the transparent film of the present invention has preferably a pencil hardness of greater than or equal to 2H.

A contact angle hysteresis to water of the transparent film of the present invention, measured by a slide falling method as the dynamic water/oil repellency characteristic, is preferably not more than 6.0°.

The transparent film of the present invention further preferably comprising a unit including:
a metal atom selected from the group consisting of Al, Fe, In, Ge, Hf, Si, Ti, Sn, Zr and Ta; and
a group bonded to the metal atom,
wherein the group bonded to the metal atom is selected from the group consisting of a second hydrocarbon chain-containing group having a length shorter than a length of the first hydrocarbon chain-containing group, a hydroxy group, an alkoxy group, and a group formed by condensation of a hydroxy group, and
wherein the unit is bonded to the polysiloxane backbone at a position of the metal atom in the unit.

The transparent film of the present invention comprises preferably a structure (A) represented by formula (1) below:

[Chemical Formula 1]

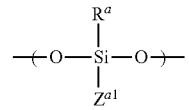

(1)

In the formula (1),
$R^a$ represents the first hydrocarbon chain-containing group,
$Z^{a1}$ represents the first hydrocarbon chain-containing group, the second hydrocarbon chain-containing group or —O— group,
$R^a$ and $Z^{a1}$ may be the same or different when $Z^{a1}$ is the first hydrocarbon chain-containing group, and
$R^a$ and $Z^{a1}$ may be the same or different when the transparent film comprises a plural number of formulae (1).

The first hydrocarbon chain-containing group comprises preferably a chain structure including not less than 6 and not more than 20 carbon atoms, or a structure in which a part of methylene groups (—CH$_2$—) in the chain structure are replaced by oxygen atoms.

Further, the transparent film of the present invention comprises preferably a structure (B) represented by formula (2) below:

[Chemical Formula 2]

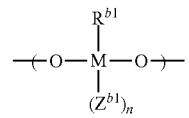

(2)

In the formula (2),
$R^{b1}$ represents the second hydrocarbon chain-containing group, hydroxy group or —O— group,
$Z^{b1}$ represents the second hydrocarbon chain-containing group, hydroxy group or —O— group,
$R^{b1}$ and $Z^{b1}$ may be the same or different when each of $Z^{b1}$ and $R^{b1}$ is the second hydrocarbon chain-containing group, $R^{b1}$ and $Z^{b1}$ may be the same or different when the transparent film comprises a plural number of formulae (2), M represents Al, Fe, In, Ge, Hf, Si, Ti, Sn, Zr or Ta, and n represents an integer of 0, 1 or 2 according to the kind of M.

The second hydrocarbon chain-containing group comprises preferably a chain structure having a length shorter than a length of the first hydrocarbon chain-containing group, or a structure in which a part of methylene groups (—$CH_2$—) in the chain structure are replaced by oxygen atoms.

M is preferably Si in the formula (2).

In the transparent film of the present invention, an abundance ratio of the structure (B) to the structure (A) as structure (B)/structure (A) is preferably not less than 4 and not more than 60 in terms of moles.

The present invention includes a substrate comprising the transparent film of the present invention on the substrate in the technical scope of the present invention.

Effects of the Invention

The transparent film of the present invention comprises a polysiloxane backbone, and a first hydrocarbon chain-containing group bonded to a part of silicon atoms forming the polysiloxane backbone and the thickness of the transparent film of the present invention is not less than 6 nm and not more than 50 nm, and the transparent film of the present invention is thus capable of attaining both water/oil repellency and hardness.

MODE FOR CARRYING OUT THE INVENTION

The transparent film of the present invention comprises a polysiloxane backbone, and a first hydrocarbon chain-containing group is bonded to a part of silicon atoms forming the polysiloxane backbone. A water/oil repellency function is exerted by the hydrocarbon chain-containing group. Since the hydrocarbon chain-containing group is bonded to a part of silicon atoms of the polysiloxane backbone, the other silicon atoms substantially function as spacers. The water/oil repellency function is further improved by bonding the hydrocarbon chain-containing group through the spacers.

In the present invention, the polysiloxane backbone represents a backbone in which silicon atoms and oxygen atoms are alternately arranged, and silicon atoms are three-dimensionally connected through oxygen atoms. The polysiloxane backbone improves the chemical and physical durability and transparency of the film. It is preferred that the polysiloxane backbone has a three-dimensional network structure including a Si—O—Si bond, and the polysiloxane backbone may have a structure in which a divalent hydrocarbon group is interposed between silicon atoms.

In the transparent film of the present invention, the first hydrocarbon chain-containing group is bonded to a part of silicon atoms which form the polysiloxane backbone.

The first hydrocarbon chain-containing group is a monovalent group containing a hydrocarbon group in the part, and the hydrocarbon chain imparts water/oil repellency to a transparent film interface (surface). Particularly, a friction coefficient between a liquid droplet (water droplet etc.) and the transparent film decreases, and the liquid droplet moves more easily.

The hydrocarbon chain-containing group is composed only of a hydrocarbon group (hydrocarbon chain), and may be a group in which a part of methylene groups (—$CH_2$—) of the hydrocarbon chain are replaced by oxygen atoms.

Even the group in which a part of itself is replaced by oxygen atoms as described above is classified as a hydrocarbon chain-containing group because a hydrocarbon chain exists in the remaining part. Methylene groups (—$CH_2$—) adjacent to Si atoms are not replaced by oxygen atoms, and two continuous methylene groups (—$CH_2$—) are not simultaneously replaced by oxygen atoms. Hereinafter, the first hydrocarbon chain-containing group is described and an oxygen-unsubstituted hydrocarbon chain-containing group (i.e., monovalent hydrocarbon, group) is taken as an example unless otherwise specified, and a part of the methylene groups (—$CH_2$—) can be replaced by oxygen atoms in the following.

The first hydrocarbon chain-containing group has a carbon number of preferably not less than 6 and not more than 20, more preferably not less than 7 and not more than 17, further preferably not less than 8 and not more than 15 in the case where the first hydrocarbon chain-containing group is a hydrocarbon group.

The structure of the first hydrocarbon chain-containing group (in the case of a hydrocarbon group) is preferably a chain structure, and the chain may be a branched chain or a linear chain.

The first hydrocarbon chain-containing group is preferably a saturated or unsaturated aliphatic hydrocarbon chain-containing group, more preferably a saturated aliphatic hydrocarbon chain-containing group in the case of a hydrocarbon group.

Examples of the saturated aliphatic, hydrocarbon chain-containing group include linear saturated aliphatic hydrocarbon chain-containing groups such as a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group and an icosyl group; and branched saturated aliphatic hydrocarbon chain-containing groups such as a methylpentyl group, an ethylpentyl group, a methylhexyl group, a ethylhexyl group, a propylhexyl group and a tert-octyl group in the case of a hydrocarbon group.

Specific examples of the group in which a part of methylene groups (—$CH_2$—) of a saturated aliphatic hydrocarbon group are replaced by oxygen atoms include groups having (poly)ethylene glycol units and groups having (poly)propylene glycol units.

The amount of silicon atoms to which the first hydrocarbon chain-containing group is bonded is preferably not less than 1 mol and not more than 19 mol, more preferably not less than 2 mol and not more than 15 mol, further preferably not less than 3 mol and not more than 12 mol in 100 mol of silicon acorns contained in the transparent film. When the transparent film includes the first hydrocarbon chain-containing group in an amount as described above, the water/oil repellency of the transparent film is further improved.

The transparent film of the present invention may further include a unit including a metal atom selected from the group consisting of Al, Fe, In, Ge, Hf, Si, Ti, Sn, Zr and Ta, and a group bonded to the metal atom, wherein the group bonded to the metal atom is selected from the group consisting of a second hydrocarbon chain-containing group having a length shorter than that of the first hydrocarbon chain-containing group, a hydroxy group, an alkoxy group, and a group formed by condensation of a hydroxy group, and wherein the unit is bonded to the polysiloxane backbone at the position of the metal atom in the unit.

Particularly, when the second hydrocarbon chain-containing group, the hydroxy group, the alkoxy group or the group formed by condensation of a hydroxy group is bonded to silicon atoms or metal atoms to which the first hydrocarbon chain-containing group is not bonded, the silicon atoms act as a spacer, and the water/oil repellency characteristics the first hydrocarbon chain-containing group can be improved.

The second hydrocarbon chain-containing group should have a length shorter than that of the first hydrocarbon chain-containing group. The length of each of the first and second hydrocarbon chain-containing groups can be evaluated as a length (longest chain length) of the longest linear chain (hereinafter, also referred to as a "main chain") including elements that is bonded to metal atoms such as Si atoms in the hydrocarbon chain-containing group. For ensuring that the second hydrocarbon chain-containing group has a main chain shorter than that of the first hydrocarbon chain-containing group, for example, the carbon number of the hydrocarbon chain moiety may be made smaller than the carbon number of the first hydrocarbon chain-containing group. The second hydrocarbon chain-containing group is normally composed only of a hydrocarbon group (hydrocarbon chain) as in the case of the first hydrocarbon chain-containing group, and may be a group in which a part of methylene groups (—$CH_2$—) are replaced by oxygen atoms. Methylene groups (—$CH_2$—) adjacent to Si atoms are not replaced by oxygen atoms, and two continuous methylene groups (—$CH_2$—) are not simultaneously replaced by oxygen atoms.

The carbon number of the hydrocarbon chain moiety means the number of carbon atoms that form the hydrocarbon group (hydrocarbon chain) in the case of an oxygen-unsubstituted hydrocarbon chain-containing group, while the carbon number of the hydrocarbon chain moiety means the number of carbon atoms which number is counted with the assumption that the oxygen atoms are considered as methylene groups (—$CH_2$—) in the case of an oxygen-substituted hydrocarbon chain-containing group.

Hereinafter, the second hydrocarbon chain-containing group is described while an oxygen-unsubstituted hydrocarbon chain-containing group (i.e., monovalent hydrocarbon group) is taken as an example unless otherwise specified, and a part of the methylene groups (—$CH_2$—) can be replaced by oxygen atoms in the following.

The second hydrocarbon chain-containing group has a carbon number of preferably not less than 1 and not more than 5, more preferably not less than 1 and not more than 3 in the case where the second hydrocarbon chain-containing group is a hydrocarbon group.

The structure of the second hydrocarbon chain-containing group is preferably a chain structure and in the chain may be a branched chain or a linear chain in the case of a hydrocarbon group.

The second hydrocarbon chain-containing group is preferably a saturated or unsaturated aliphatic hydrocarbon chain-containing group, more preferably a saturated aliphatic hydrocarbon chain-containing group in the case of a hydrocarbon group.

When saturated aliphatic hydrocarbon chain-containing group is more preferably a saturated aliphatic hydrocarbon group in the case of a hydrocarbon group. Examples of the saturated aliphatic hydrocarbon group include linear saturated aliphatic hydrocarbon chain-containing groups such as a methyl group, an ethyl group, a propyl group, a butyl group and a pentyl group; and branched saturated aliphatic hydrocarbon chain-containing groups such as an isopropyl group, an isobutyl group, an isopentyl group and a 2-pentyl group.

When a part of methylene groups (—$CH_2$—) of a saturated aliphatic hydrocarbon group are replaced by oxygen atoms, specific examples may include groups having (poly) ethylene glycol units.

The carbon number of the alkoxy group is preferably 1 to 4, more preferably 1 to 3. Examples of the alkoxy group include a butoxy group, a propoxy group, an ethoxy group and a methoxy group.

The hydroxy group may be condensed with other hydroxy group, an alkoxy group or the like to form —O— group, and such a group formed by condensation of a hydroxy group may be bonded to the metal atoms.

The structure in which the first hydrocarbon chain-containing group is bonded to a silicon atom is preferably a structure (A) represented by the following formula (1).

[Chemical Formula 3]

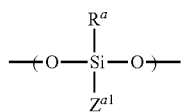

(1)

In the formula (1), $R^a$ represents the first hydrocarbon chain-containing group, $Z^{a1}$ represents the first hydrocarbon chain-containing group, the second hydrocarbon chain-containing group or —O— group, $R^a$ and $Z^{a1}$ may be the same or different when $Z^{a1}$ is the first hydrocarbon chain-containing group, and $R^a$ and $Z^{a1}$ may be the same or different when the transparent film comprises a plural number of formulae (1).

In the formula (1), the first hydrocarbon chain-containing group represented by $R^a$ or $Z^{a1}$, and the second hydrocarbon chain-containing group represented by $Z^{a1}$ can be appropriately selected from the groups described above as the first hydrocarbon chain-containing group and the second hydrocarbon chain-containing group, respectively.

In particular, $Z^{a1}$ is preferably a second hydrocarbon chain-containing group or —O— group, and especially preferably —O— group.

Preferable examples of the structure (A) may include chain structures represented by the following formulae (1-1) to (1-32) for example.

[Chemical Formula 4]

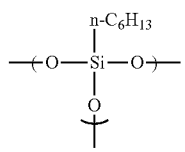

(1-1)

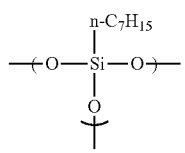

(1-2)

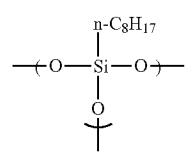 (1-3)
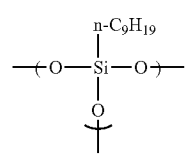 (1-4)
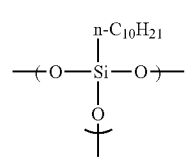 (1-5)
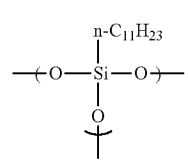 (1-6)
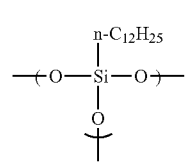 (1-7)
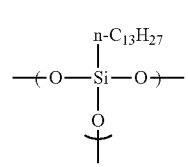 (1-8)
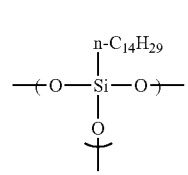 (1-9)
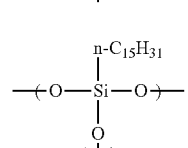 (1-10)
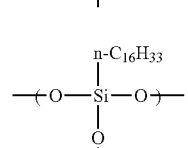 (1-11)
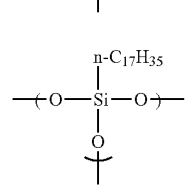 (1-12)
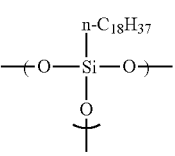 (1-13)
[Chemical Formula 5]
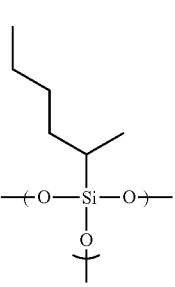 (1-14)
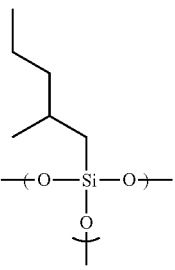 (1-15)
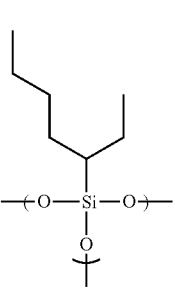 (1-16)
(1-17)
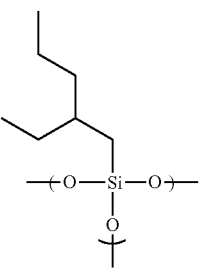 (1-18)

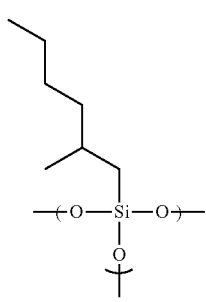 (1-19)
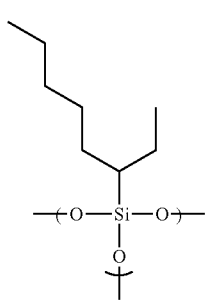 (1-20)
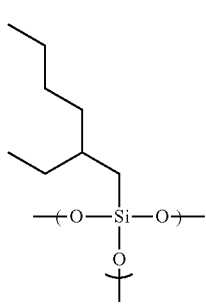 (1-21)
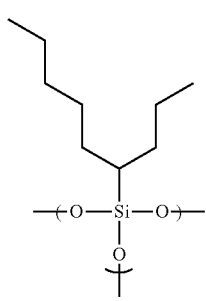 (1-22)
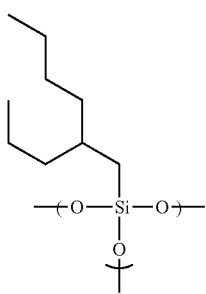 (1-23)
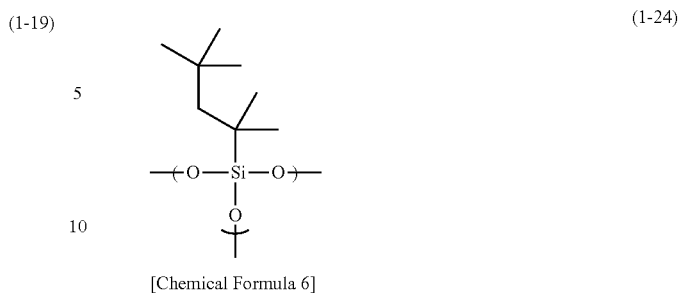 (1-24)
[Chemical Formula 6]
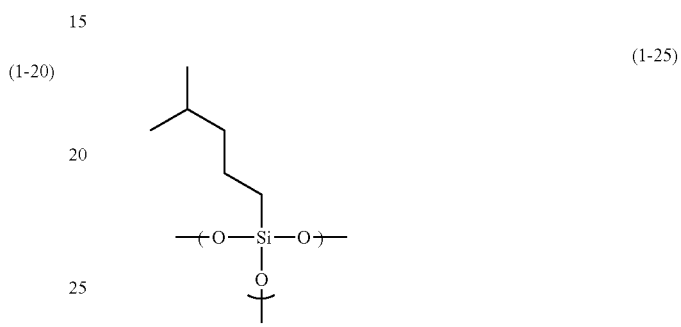 (1-25)
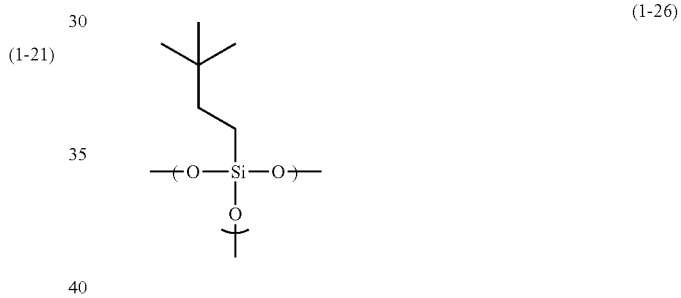 (1-26)
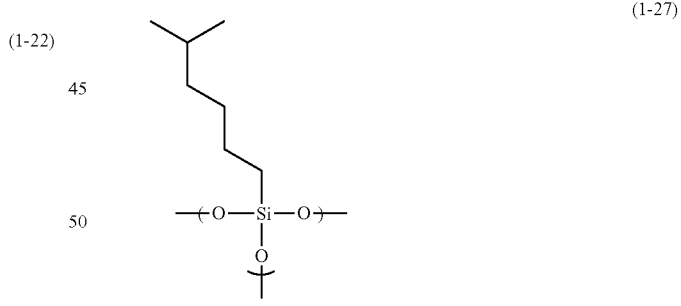 (1-27)
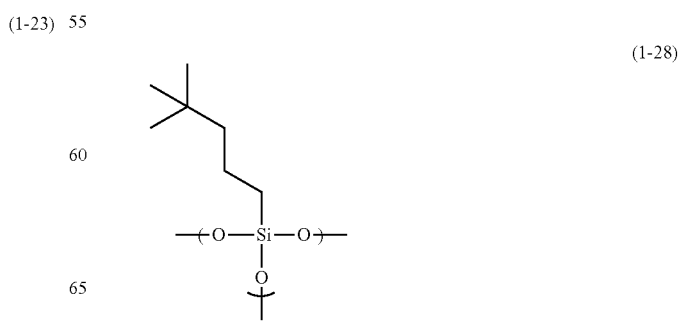 (1-28)

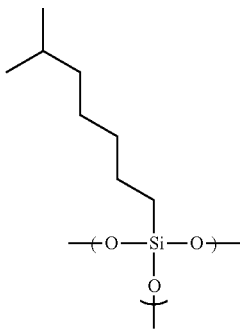

(1-29)

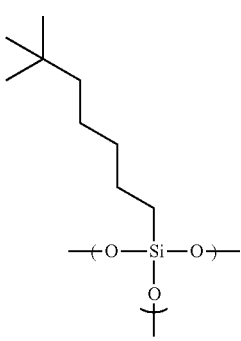

(1-30)

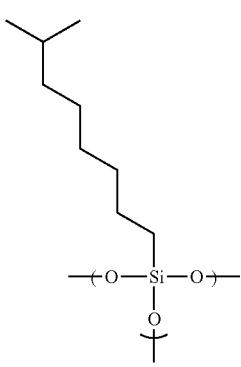

(1-31)

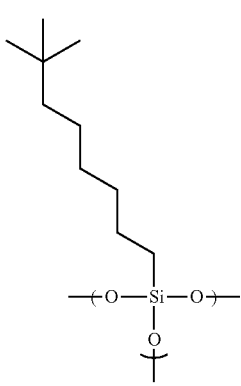

(1-32)

In the transparent film of the present invention, the second hydrocarbon chain-containing group or a hydroxy group may be bonded to a silicon atom (second silicon atom) that is different from the silicon atom to which the first hydrocarbon chain-containing group is bonded, or other metal atom that replaces the silicon atom. The second silicon atoms or other metal atoms also behave as a spacer to enhance the water/oil repellency characteristics of the first hydrocarbon chain-containing group since the second hydrocarbon chain-containing group that is short in length or hydroxy group is bonded to the second silicon atoms or other metal atoms.

The structure in which the second hydrocarbon chain-containing group is bonded to the second silicon atom or other metal atom is preferably a structure (B) represented by the following formula (2).

[Chemical Formula 7]

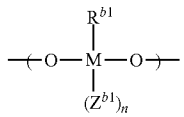

(2)

In the formula (2), $R^{b1}$ represents the second hydrocarbon chain-containing group, hydroxy group or —O— group, $Z^{b1}$ represents the second hydrocarbon chain-containing group, hydroxy group or —O— group, $R^{b1}$ and $Z^{b1}$ may be the same or different when each of $Z^{b1}$ and $R^{b1}$ is the second hydrocarbon chain-containing group, $R^{b1}$ and $Z^{b1}$ may be the same or different when the transparent film comprises a plural number of formulae (2), M represents Al, Fe, In, Ge, Hf, Si, Ti, Sn, Zr or Ta, and n represents an integer of 0, 1 or 2 according to the kind of M.

In the formula (2), the second hydrocarbon chain-containing group can be appropriately selected from the groups described above.

$R^{b1}$ and $Z^{b1}$ preferably do not represent a hydrocarbon-containing group simultaneously.

In particular, $Z^{b1}$ is preferably a hydroxy group or —O— group.

M is preferably a trivalent metal such as Al, a tetravalent metal such as Si, Ti, Sn or Zr, more preferably Al, Si, Ti, Zr, especially preferably Si.

In the formula (2), n represents 0 when M is a trivalent metal such as Al, Fe or In, and n represents 1 when M is a tetravalent metal such as Ge, Hf, Si, Ti, Sn or Zr. n represents 2 when M is a pentavalent metal such as Ta.

Preferable examples of the structure (B) include chain structures represented by the following formulae (2-1) to (2-12) when M is Si.

[Chemical Formula 8]

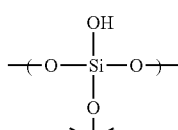

(2-1)

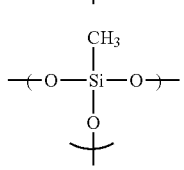

(2-2)

(2-1)

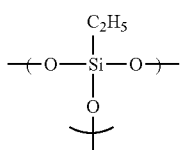

(2-2)

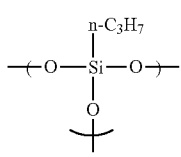

(2-3)

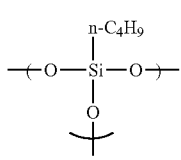

(2-4)

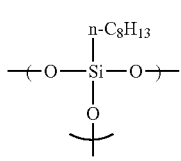

(2-5)

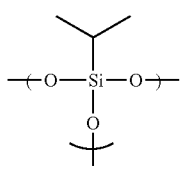

(2-6)

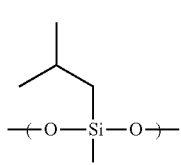

[Chemical Formula 9]

(2-7)

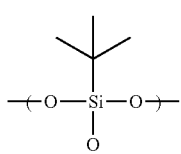

(2-8)

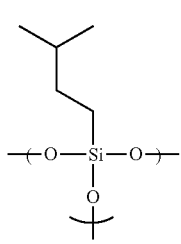

(2-9)

(2-10)

(2-11)

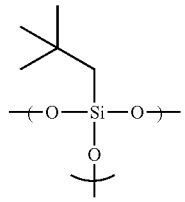

(2-12)

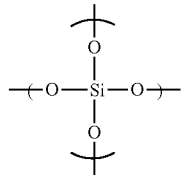

The abundance ratio of the structure (B) to the structure (A) as structure (B)/structure (A) is preferably not less than 4 and not more than 60, more preferably not less than 8 and not more than 48, further preferably not more than 12 and not less than 40, especially preferably not less than 16 and not more than 32 in terms of moles.

The transparent film of the present invention comprises a structure in which the first hydrocarbon chain-containing group is bonded to a part of silicon atoms on the polysiloxane backbone. In order to form the transparent film, an organosilicon compound (A) which comprises the first hydrocarbon chain-containing group and a hydrolyzable group that are bonded to silicon atom and a metal compound (B) which comprises a hydrolyzable group, and not the first hydrocarbon chain-containing group may be mixed to obtain a coating composition. The coating composition may be diluted with a solvent (C) as necessary, and brought into contact with a substrate in air. By contacting the coating composition with the substrate in air, the hydrolyzable groups of the organosilicon compound (A) and the metal compound (B) are subjected to hydrolysis and polycondensation to form a siloxane backbone with a first hydrocarbon group bonded to silicon atoms of the backbone.

The organosilicon compound (A) is preferably an organosilicon compound in which at least one first hydrocarbon chain-containing group and at least one hydrolyzable group are bonded to a silicon atom in one molecule.

In the organosilicon compound (A), the number of first the hydrocarbon chain-containing groups bonded to the center silicon atom is preferably not less than 1 and not more than 3, more preferably not more than 2, especially preferably 1.

The hydrolyzable group may be a group that presides a hydroxy group (silanol group) through hydrolysis, and preferred examples thereof may include alkoxy groups with a carbon number of 1 to 4, such as methoxy group, ethoxy group, propoxy group and butoxy group; hydroxy group; acetoxy group; chlorine atom; and isocyanate group. In particular, alkoxy groups with a carbon number of 1 to 4 are preferable, and alkoxy groups with a carbon number of 1 or 2 are more preferable.

In the organosilicon compound (A), the number of hydrolyzable groups bonded to the center silicon atom is not less than 1, preferably not less than 2, and is normally preferably not more than 3.

In addition to the first hydrocarbon chain-containing group and the hydrolyzable group, the second hydrocarbon chain-containing group having a length shorter than that of the first hydrocarbon-containing group may be bonded to the center silicon atom of the organosilicon compound (A).

Specifically, the organosilicon compound (A) is preferably a compound represented by the following formula (I).

[Chemical Formula 10]

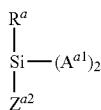

(I)

In the formula (I), $R^a$ represents the same meaning as described above, and a plurality of $A^{a1}$ each independently represent a hydrolyzable group.

$Z^{a2}$ represents the first hydrocarbon chain-containing group, the second hydrocarbon chain-containing group or the hydrolyzable group, $R^a$ and $Z^{a2}$ may be the same or different, when $Z^{a2}$ is the first hydrocarbon chain-containing group, and $Z^{a2}$ and $A^{a1}$ may be the same or different when $Z^{a2}$ is a hydrolyzable group.

$R^a$ and $Z^{a2}$ may be the same or different when the transparent film comprises a plural number of formulae (I).

In the formula (I), the first hydrocarbon chain-containing group represented by $R^a$ or $Z^{a2}$, the second hydrocarbon chain-containing group represented by $Z^{a2}$, and the hydrolyzable group represented by $A^{a1}$ or $Z^{a2}$ can be appropriately selected from the groups described above as the first hydrocarbon chain-containing group, the second hydrocarbon chain-containing group and the hydrolyzable group, respectively.

In the formula (I), $Z^{a2}$ is preferably the second hydrocarbon chain-containing group or the group, more preferably the hydrolyzable group.

Preferable examples of the organosilicon compound (A) may include compounds having one first hydrocarbon chain-containing group and three hydrolyzable groups; and compounds having one first hydrocarbon chain-containing group, one second hydrocarbon chain-containing group and two hydrolyzable groups.

In the compound, having one first hydrocarbon chain-containing group and three hydrolyzable groups, the three hydrolyzable groups are bonded to the silicon atom. Examples of the group in which three hydrolyzable groups are bonded to a silicon atom include trialkoxysilyl groups such as trimethoxysilyl group, triethoxysilyl group, tripropoxysilyl group and tributoxysilyl group; trihydroxysilyl group; triacetoxysilyl group; trichlorosilyl group; and triisocyanatesilyl group, and examples of the compound having one first hydrocarbon chain-containing group and three hydrolyzable groups include compounds in which one first hydrocarbon, chain-containing group selected from the groups described above is bonded to the silicon atom of the above-mentioned group in which three hydrolyzable groups are bonded to a silicon atom.

In the compound having one first hydrocarbon chain-containing group, one second hydrocarbon chain-containing group and two hydrolysable groups, one second hydrocarbon chain-containing group and two hydrolyzable groups are bonded to a silicon atom. Examples of the group in which one hydrocarbon chain-containing group and two hydrolyzable groups are bonded to a silicon atom include alkyldialkoxysilyl groups such as methyidimethoxysilyl group, ethyldimethoxysilyl group, methyldiethoxysilyl group, ethyldiethoxysilyl group and methyldipropoxysilyl group, and examples of the compound having one first hydrocarbon chain-containing group, one second hydrocarbon chain-containing group and two hydrolyzable groups include compounds in which one first hydrocarbon chain-containing group selected from the groups described above is bonded to the silicon atom of the above-mentioned group.

Specific examples of the compound having one first hydrocarbon chain-containing group and three hydrolyzable groups include alkyltrialkoxysilanes such as alkyltrimethoxysilanes having an alkyl group with a carbon number of 6 to 20, and alkyltriethoxysilanes having an alkyl group with a carbon number of 6 to 20; alkyltrihydroxysilanes having an alkyl group with a carbon number of 6 to 20; alkyltriacetoxysilanes having an alkyl group with a carbon number of 6 to 20; trichlorosilanes having an alkyl group with a carbon number of 6 to 20; and alkyltriisocyanatesilanes having an alkyl group with a carbon number of 6 to 20.

Specific examples of the compound having one first hydrocarbon chain-containing group, one second hydrocarbon chain-containing group and two hydrolyzable groups include alkylmethyldialkoxysilanes such as alkylmethyldimethoxysilanes having an alkyl group with a carbon number of 6 to 20, and alkylmethyldiethoxysilanes having an alkyl group with a carbon number of 6 to 20; alkylmethyldihydroxysilanes having an alkyl group with a carbon number of 6 to 20; alkylmethyldiacetoxysilanes having an alkyl group with a carbon number of 6 to 20, alkylmethyldichlorosilanes having an alkyl group with a carbon number of 6 to 20; and alkylmethyldiisocyanatesilanes having an alkyl group with a carbon number of 6 to 20.

In particular, compounds having one first hydrocarbon chain-containing group and three hydrolyzable groups are preferable, and alkyltrialkoxysilanes are more preferable.

The metal compound (B) does not have the first hydrocarbon chain-containing group and at least one hydrolyzable group is bonded to the center metal atom of the metal compound (B). The second hydrocarbon chain-containing group may be bonded to the metal atom. The second hydrocarbon chain-containing group has a length shorter than that of the first hydrocarbon chain-containing group and is less bulky than the first hydrocarbon chain-containing group, and therefore a part with a spacer function may be formed in the transparent film.

The center metal atom in the metal compound (B) may be a metal atom that is capable of forming a metal alkoxide with a bond to an alkoxy group, and the metals here include semimetals such as Si. Specific examples of the center metal atom in the metal compound (B) include trivalent metals such as Al, Fe and In; tetravalent metals such as Ge, Hf, Si, Ti, Sn and Zr; and pentavalent metals such as Ta. The center metal atom is preferably a trivalent metal, such as Al; a tetravalent metal such as Si, Ti, Sn or Zr; more preferably Al, Si, Ti or Zr; further preferably Si.

The hydrolyzable group in the metal compound (B) may be a group similar to the hydrolyzable group in the organosilicon compound (A), and is preferably an alkoxy group with a carbon number of 1 to 4, more preferably an alkoxy group with a carbon number of 1 or 2. The hydrolyzable groups in the organosilicon compound (A) and the metal compound (B) may be the same or different. Each of the hydrolyzable groups in the organosilicon compound (A) and the metal compound (B) is preferably an alkoxy group with a carbon number of 1 to 4.

In the metal compound (B), the number of hydrolyzable groups is preferably not less than 1, more preferably not less than 2, further preferably not less than 3, and is preferably not more than 4.

The second hydrocarbon chain-containing group in the metal compound (B) can be appropriately selected from the groups described above, and the number is preferably not more than 1, especially preferably 0.

Specifically, the metal compound (B) is preferably a compound represented by the following formula (II).

[Chemical Formula 11]

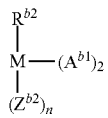

(II)

In the formula (II),

M represents the same meaning as described above, and $R^{b2}$ represents the second hydrocarbon chain-containing group or the hydrolyzable group, and the plurality of $A^{b1}$ each independently represent the hydrolyzable group.

$Z^{b2}$ represents the second hydrocarbon chain-containing group or the hydrolyzable group.

$R^{b2}$ and $Z^{b2}$ and may be the same or different when each of $R^{b2}$ and $Z^{b2}$ is the second hydrocarbon chain-containing group, and $R^{b2}$ and $Z^{b2}$ may be the same or different when the transparent film comprises a plural number of formulae (II).

$R^{b2}$ and $A^{b1}$ may be the same or different when $Z^{b2}$ is the hydrolyzable group, n represents an integer of 0, 1 or 2 according to the kind of metal M.

In the formula (II), the second hydrocarbon chain-containing group represented by $R^{b2}$ or $Z^{b2}$, and the hydrolyzable group represented by $R^{b2}$ or $A^{b1}$ or $Z^{b2}$ can be appropriately selected from the groups described above as the second hydrocarbon chain-containing group and the hydrolyzable group. The hydrolyzable group can be appropriately selected from the groups described above, and is preferably an alkoxy group with a carbon number of 1 to 4, further preferably an alkoxy group with a carbon number of 1 or 2.

In the formula (II), $R^{b2}$ is preferably a hydrolyzable group, and $Z^{b2}$ is preferably a hydrolyzable group. Further, each of $R^{b2}$ and $Z^{b2}$ is preferably a hydrolyzable group. Here, $R^{b2}$ and $A^{b1}$ may be the same or different, and is preferably the same. $R^{b2}$, $A^{b1}$ and $Z^{b2}$ are more preferably the same hydrolyzable groups. Further, the hydrolyzable groups in the organosilicon compound (A) and the metal compound (B) may be the same or different.

In the formula (II), the metal M is preferably Al, Si, Ti, Zr or Sn, more preferably Al, Si, Ti or Zr, further preferably Si. The alkoxide of such a metal is easily liquefied, so that the uniformity of the distribution of the structure (B) in the transparent film is easily improved.

n represents 0 when M is a travalent metal, n represents 1 when M is a tetravalent metal, and n represents 2 when M is a pentavalent metal.

Preferable examples of the metal compound (B) may include compounds having only the hydrolyzable group; compounds having the second hydrocarbon chain-containing group and the hydrolyzable group; and a compound having two second hydrocarbon chain-containing groups and the hydrolyzable group.

Examples of the compound having only the hydrolyzable group include tetraalkoxysilanes such as tetramethoxysilane, tetraethoxysilane, tetrapropoxysilane and tetrabutoxysilane; trialkoxyaluminums such as triethoxyaluminum, tripropoxyaluminum and tributoxyaluminum; trialkoxyirons such as triethoxyiron; trialkoxyindiums such as trimethoxyindium, triethoxyindium, tripropoxyindium and tributoxyindium; tetraalkoxygermaniums such as tetramethoxygermanium, tetraethoxygermanium, tetrapropoxygermanium and tetrabutoxygermanium; tetraalkoxyhafniums such as tetramethoxyhafnium, tetraethoxyhafnium, tetrapropoxyhafnium and tetrabutoxyhafnium; tetraalkoxytitaniums such as tetramethoxytitanium, tetraethoxytitanium, tetrapropoxytitanium and tetrabutoxytitanium; tetraalkoxytins such as tetramethoxytin, tetraethoxytin, tetrapropoxytin and tetrabutoxytin; tetraalkoxyzirconiums such as tetramethoxyzirconium, tetraethoxyzirconium, tetrapropoxyzirconium and tetrabutoxyzirconium; and pentaalkoxytantalums such as pentamethoxytantalum, pentaethoxytantalum, pentapropoxytantalum and pentabutoxytantalum.

Examples of the compound having the second hydrocarbon chain-containing group and the hydrolyzable group include alkyltrialkoxysilanes such as methyltrimethoxysilane, ethyltriethoxysilane, methyltriethoxysilane, ethyltriethoxysilane and methyltripropoxysilane; and alkenyltrialkoxysilanes such as vinyltrimethoxysilane and vinyltriethoxysilane.

Examples of the compound having two second hydrocarbon chain-containing groups and the hydrolyzable group include dialkyldialkoxysilanes such as dimethyldimethoxysilane, diethyldimethoxysilane, dimethyldiethoxysilane and diethyldiethoxysilane.

The molar ratio of the metal compound (B) to the organosilicon compound (A) as organosilicon compound (A)/metal compound (B) is not more than 0.2, more preferably not more than 0.15, further preferably not more than 0.1, and preferably not less than 0.01, more preferably not less than 0.02, further preferably not less than 0.025.

Examples of the solvent for diluting the organosilicon compound (A) and the metal compound (B) include hydrophilic organic solvents such as an alcohol-based solvent, an ether-based solvent, a ketone-based solvent, an ester-based solvent and an amide-based solvent. These solvents may be used singly, or used in combination of two or more thereof.

Examples of the alcohol-based solvent include methanol, ethanol, propanol, butanol, ethylene glycol, propylene glycol and diethylene glycol, examples of the ether-based solvent include dimethoxy ethane, tetrahydrofuran and dioxane, examples of the ketone-based solvent include acetone and methyl ethyl ketone, examples of the ester-based solvent include ethyl acetate and butyl acetate, and examples of the amide-based solvent include dimethylformamide.

In particular, alcohol-based solvents and ether-based solvents are preferable, and alcohol-based solvents are more preferable.

The amount of the solvent is preferably not more than 120 parts by mass, more preferably not more than 80 parts by mass, further preferably not more than 60 parts by mass, especially preferably not more than 40 parts by mass, and preferably not less than 3 parts by mass, more preferably not less than 5 parts by mass, further preferably not less than 10 parts by mass, especially preferably not less than 20 parts by mass based on 1 part by mass of the total of the organosilicon compound (A) and the metal compound (B).

A catalyst may coexist at the time of contact of the organosilicon compound (A) and the metal compound (B) to a base material. The catalyst can be arbitrarily selected from acidic compounds such as hydrochloric acid; basic compounds; organometalic compounds and the like, which are generally used in a sol-gel method. Examples of the acidic compound include inorganic acids such as hydrochloric acid and nitric acid; and organic acids such as acetic acid. Examples of the basic compound include ammonia and amine. The organometallic compound include an organometalic compound having as a center metal a metal element such as Al, Fe, Zn, Sn or Zr, and examples thereof include organoaluminum compounds such as aluminum-acetylacetone complexes and aluminum-ethyl acetoacetate complexes; organoiron compounds such as iron octylate; organozinc compounds such as zinc acetylacetonate monohydrate, zinc naphthenate and zinc octylate; and organotin compounds such as dibutyl tin diacetate complexes.

In particular, the catalyst is preferably an organometallic compound, more preferably an organoaluminum compound, especially preferably an organoaluminum ethyl acetoacetate compound.

The amount of the catalyst is preferably not less than 0.0001 parts by mass, more preferably not less than 0.1 parts by mass, further preferably not less than 0.5 parts by mass, especially preferably not less than 1 part by mass, and preferably not more than 20 parts by mass, more preferably not more than 10 parts by mass, further preferably not more than 5 parts by mass based on 100 parts by mass of the total of the organosilicon compound (a) and the metal compound (b).

When the catalyst is an acidic compound (especially hydrochloric acid), the amount of the acidic compound is preferably not less than 0.0001 parts by mass, more preferably not less than 0.0005 parts by mass, further preferably not less than 0.001 parts by mass, and preferably not more than 1 part by mass, more preferably not more than 0.5 parts by mass, further preferably not more than 0.3 parts by mass based on 100 parts by mass of the total of the organosilicon compound (A) and the metal compound (B).

Further, at the time of contact of the organosilicon compound (A) and the metal compound (B) to a substrate, various kinds of additives such as an antioxidant, a rust inhibitor, an ultraviolet absorber, a light stabilizer, an antifungal agent, an antibacterial agent, an organism deposition preventing agent, a deodorizer, a pigment, a flame retardant and an antistatic agent may coexist.

Examples of the antioxidant include phenol-based antioxidants, sulfur-based antioxidants, phosphorus-based antioxidants and hindered amine-based antioxidants.

Examples of the phenol-based antioxidant include n-octadecyl-3-(4-hydroxy-3,5-di-t-butylphenyl)propionate, 2,6-di-t-butyl-4-methylphenol, 2,2-thio-diethylene-bis-[3-(3,5-di-t-butyl-4-hydroxyphenyl)propionate], tri-ethyleneglycol-bis-[3-(3-t-butyl-5-methyl-4-hydroxyphenyl)propionate], 3,9-bis[2-(3-(3-t-butyl-4-hydroxy-5-methylphenyl)propionyloxy]-1,1-dimethylethyl)-2,4,8,10-tetraoxaspiro[5•5]undecane, tetrakis[3-(3,5-di-t-butyl-4-hydroxyphenyl)-propionic acid]pentaerythrityl esters, 2-t-butyl-6-(3-t-butyl-2-hydroxy-5-methylbenzyl)-4-methylphenyl acrylate, 2-[1-(2-hydroxy-3,5-di-t-pentylphenyl)ethyl]-4,6-di-t-pentylphenyl acrylate, 1,3,5-trimethyl-2,4,6-tris(3,5-di-t-butyl-4-hydroxybenzyl)benzene, tris(3,5-di-t-butyl-4-hydroxybenzyl) isocyanurate, 1,3,5-tris(4-t-butyl-3-hydroxy-2,6-dimethylbenzyl)-1,3,5-triazine-2,4,6-(1H,3H,5H)-trione, 2,2'-methylenebis(6-t-butyl-4-methylphenol), 4,4'-butylidenebis (6-t-butyl-3-methylphenol) and 4,4'-thiobis(6-t-butyl-3-methylphenol).

Examples of the sulfur-based antioxidant, include 3,3'-thiodipropionic acid di-n-dodecyl esters, 3,3'-thiodipropionic acid di-n-tetradecyl esters, 3,3'-thiodipropionic acid di-n-octadecyl esters and tetrakis(3-dodecylthiopropionic acid)pentaerythritol esters.

Examples or the phosphorus-based antioxidant include tris(2,4-di-t-butylphenyl)phosphite, bis(2,4-di-t-butylphenyl)pentaerythritol diphosphite, bis(2,6-di-t-butyl-4-methylphenyl)pentaerythritol diphosphite, bis(2,4-di-cumylphenyl)pentaerythritol diphosphite, tetrakis(2,4-di-t-butylphenyl)-4,4'-biphenylene diphosphonite and bis-[2,4-di-t-butyl-(6-methyl)phenyl]ethyl phosphite.

Examples of the hindered amine-based antioxidant include sebacic acid bis(2,2,6,6-tetramethyl-4-piperidyl)esters (melting point: 81 to 86° C., 2,2,6,6-tetramethyl-4-piperidyl methacrylate (melting point; 58° C.), and poly[{6-(1,1,3,3-tetramethylbutyl)amino-1,3,5-triazine-2,4-diyl}{2,2,6,6-tetramethyl-4-piperidyl)imino}-1,6-hexamethylene{(2,2,6,6-tetramethyl-4-piperidyl)imino}].

Examples of the rust inhibitor include alkanol amines such as triethanol amine; quaternary ammonium salts; alkanethiols; azoles such as imidazoline, imidazole, alkylimidazoline derivatives, benzimidazole, 2-mercapto-benzimidazole and benzotriazole; sodium metavanadate; bismuth citrate; phenol derivatives; amine compounds such as aliphatic amines including alkylamines and polyalkenylamines, aromatic amines, ethoxylated amines, cyanoalkylamines, cyclohexylamine benzoate, aliphatic diamines such as alkylenediamines, and aromatic diamines; amides of the amine compounds and carboxylic acid; alkyl esters; pyrimidine; naphthenic acid; sulfonic acid composites; nitrous acid salts such as calcium nitrite, sodium nitrite and dicyclohexylamine nitrite; polyol compounds such as polyalcohols and polyphenols; heteropolyacid salts such as sodium molybdate, sodium tungstate, sodium phosphonate, sodium chromate and sodium silicate; gelatin; polymers of carboxylic acid; nitro compounds; formaldehyde; acetylene alcohol; thiol compounds such as aliphatic thiols, aromatic thiols and acetylene thiols; sulfide compounds such as aliphatic sulfide, aromatic sulfide and acetylene sulfide; sulfoxide compounds such as sulfoxide and dibenzylsulfoxide; thio area; combinations of an amine or quaternary ammonium salt and halogen ions; combinations of an alkylamine and potassium iodide; combinations of tannin and sodium phosphate; combinations of triethanolamine and laurylsarcosine; combinations of triethanolamine, laurylsarcosine and benzotriazole; and combinations of an alkylamine, benzotriazole, sodium nitrite and sodium phosphate.

Examples of the ultraviolet absorber/light stabilizer include for example 2-(5-methyl-2-hydroxyphenyl)benzotriazole, 2-[2-hydroxy-3,5-bis(α,α-dimethylbenzyl)phenyl]-2H-benzotriazole, 2-(3-t-butyl-5-methyl-2-hydroxyphenyl)-5-chlorobenzotriazole, 2-(2'-hydroxy-5'-t-octylphenyl) benzotriazole, condensation products of methyl-3-[3-t-butyl-5-(2H-benzotriazol-2-yl)-4-hydroxyphenyl] propionate-polyethylene glycol (molecular weight: about 300), hydroxyphenyl benzotriazole derivatives, 2-(4,6-diphenyl-1,3,5-triazin-2-yl)-5[(hexyl)oxy]-phenol and 2-ethoxy-2'-ethyl-oxalic acid bisanilide.

Examples of the antifungal agent/antibacterial agent include 2-(4-thiazolyl)benzimidazole, sorbic acid, 1,2-benzisothiazolin-3-one, (2-pyridylthio-1-oxide)sodium, dehydroacetic acid, 2-methyl-5-chloro-4-isothiasolone complexes, 2,4,5,6-tetrachloropthalonitrile, methyl 2-benzimidazolecarbamate, methyl 1-(butylcarbamoyl)-2-benzimidazolecarbamate, mono- or dibromocyanoacetamides, 1,2-dibromo-2,4-dicyanobutane, 1,1-dibromo-1-nitropropanol and 1,1-dibromo-1-nitro-2-acetoxypropane.

Examples of the organism deposition preventing agent include tetraethylthiuram disulfide, zinc bis(N,N-dimethyldithiocarbamate), 3-(3,4-dichlorophenyl)-1,1-dimethylurea, dichloro-N-((dimethylamino)sulfonyl)fluoro-N-(P-tryl) methanesulpheneamide, pyridine-triphenylborane, N,N-dimethyl-N'-phenyl-N'-(fluorodichloromethylthio)sulfamide, cuprous thiocyanate (1), cuprous oxide, tetrabutylthiuram disulfide, 2,4,5,6-tetrachloroisophthaionitrile, zinc ethylenebisdithiocarbamate, 2,3,5,6-tetrachloro-4-(methylsulfonyl) pyridine, N-(2,4,6-trichlorophenyl)maleimide, bis(2-pyridinethiol-1-oxide)zinc salts, bis(2-pyridinethiol-1-oxide) copper salts, 2-methylthio-4-t-butylamino-6-cyclopropylamino-s-triazine, 4,5-dichloro-2-n-octcyl-4-isothiazolin-3-one, furanones, alkylpyridine compounds, gramine-based compounds and isotonyl compounds.

Examples of the deodorizer include organic acids such as lactic acid, succinic acid, malic acid, citric acid, maleic acid, malonic acid, ethylenediamine polyacetic acid, alkane-1,2-dicarboxylic acids, alkene-1,2-dicarboxylic acids, cycloalkane-1,2-dicarboxylic acids, cycloalkene-1,2-dicarboxylic acids and naphthalene sulfonic acid; fatty acid metals such as zinc undecylenate, zinc 2-ethyl hexanoate and zinc ricinoleate; metal compounds such as iron oxide, iron sulfate, zinc oxide, zinc sulfate, zinc chloride, silver oxide, copper oxide, metal (iron, copper or the like) chlorophyllin sodium, metal (iron, copper, cobalt or the like) phthalocyanine, metal (iron, copper, cobalt or the like) tetrasulfonic acid phthalocyanine, titanium dioxide and visible light-responsive titanium dioxide (nitrogen-doped-type or the like); cyclodextrins such as α-, β- or γ-cyclodextrin, methyl derivatives thereof, hydroxypropyl derivatives, glucosyl derivatives and maltosyl derivatives; and porous materials such as acrylic acid-based polymers including porous methacrylic acid polymers and porous acrylic acid polymers, aromatic-based polymers including porous divinylbenzene polymers, porous styrene-divinylbenzene-vinylpyridine polymers and porous divinylbenzene-vinylpyridine polymers, copolymers thereof, chitin, chitosan, activated carbon, silica gel, activated alumina, zeolite and ceramics.

Examples of the pigment include carbon black, titanium oxide, phthalocyanine-based pigments, quinacridone-based pigments, isoindolinone-based pigments, perylene or perynine-based pigments, quinophthalone-based pigments, diketopyrrolo-pyrrole-based pigments, dioxazine-based pigments, disazo-condensed-based pigments and benzimidazolone-based pigments.

Examples of the flame retardant include decabromobiphenyl, antimony trioxide, phosphorus-based flame retardants and aluminum hydroxide.

Examples of the antistatic agent include cationic surfactants of quaternary ammonium salt type; amphoteric surfactants of betaine type; anionic surfactants of alkyl phosphate type; cationic surfactants such as primary amine salts, secondary amine salts, tertiary amino salts, quaternary amine salts and pyridine derivatives; anionic surfactants such as sulfated oil, soap, sulfated ester oil, sulfated amide oil, sulfated ester salts of olefins, fatty alcohol sulfuric acid ester salts, alkylsulfuric acid ester salts, fatty acid ethyl sulfonic acid salts, alkylnaphthalene sulfonic acid salts, alkylbenzene sulfonic acid salts, succinic acid ester sulfonic acid salts and phosphoric acid ester salts; nonionic surfactants such as partial fatty acid esters of polyhydric alcohols, ethylene oxide adducts of fatty alcohols, ethylene oxide adducts of fatty acids, ethylene oxide adducts of fatty amino or fatty acid, amides, ethylene oxide adducts of alkylphenols, ethylene oxide adducts of partial fatty acid esters of polyhydric alcohols and polyethylene glycol; and amphoteric surfactants such as carboxylic acid derivatives and imidazoline derivatives.

As additives, a lubricant, a filler, a plasticizer, a nucleating agent, an antiblocking agent, a foaming agent, an emulsifier, a brightening agent, a binder and the like may further coexist.

When these additives are contained, the content of the additives is normally 0.1 to 70% by mass, preferably 0.1 to 50% by mass, more preferably 0.5 to 30% by mass, further preferably 2 to 15% by mass in the coating composition containing the organosilicon compound (A) and the metal compound (B).

The content of the total of the organosilicon compound (A) and the metal compound (B) (the total of the organosilicon compound (A), the metal compound (B) and the solvent (C) when the solvent (C) is contained) is normally not less than 60% by mass, preferably not less than 75% by mass, more preferably not less than 85% by mass, further preferably not less than 95% by mass in the coating composition.

Examples of the method for contacting the organosilicon compound (A) and the metal compound (B) to a substrate include a spin coating method, a dip coating method, a spray coating method, a roll coating method, a bar coating method and a die coating method, and a spin coating method or spray coating method is preferable. According to the spin coating method or spray coating method, a transparent film having a predetermined thickness is easily formed.

When the organosilicon compound (A) and the metal compound (B) are left, standing in air while being in contact with a substrate, moisture in the air is captured to hydrolysis the hydrolyzable group to form a siloxane backbone. The resulting transparent film may be further dried. The drying temperature is normally not less than 40° C. and not more than 250° C., preferably not less than 60° C. and not more than 200° C., further preferably not less than 60° C. and not more than 150° C.

In the present invention, both the water/oil repellency and the high hardness of the transparent film can be attained by adjusting the thickness of the transparent nm to not less than 6 nm and not more than 50 nm. The thickness of the transparent film is preferably not less then 8 nm and not more than 40 nm. For the water/oil repellency, the thickness of the transparent film is preferably not less than 6 nm, and for increasing the hardness, the thickness of the transparent film is preferably not more than 50 nm.

In the transparent film of the present invention, it is preferable that a plurality of layers having different densities exist in a thickness direction from the surface of the base material to the outermost surface of the transparent film. The number of layers is preferably not less than 3, and for example, it is preferable that a layer which is in contact with a substrate (referred to as a substrate interface layer), and a layer which is situated as an outermost surface and is in contact with air (referred to as a surface layer) exist, and one or more inner layers exist between the substrate interface layer and the surface layer. One of the substrate interface layer and the inner layer may be absent, and in this case, the transparent film includes, for example, the substrate interface layer and the surface layer, or only the surface layer.

In a thick transparent film with, inferior hardness (e.g., a transparent film having a thickness of more than 50 nm), the interface roughness between the layers tend to vary among the interface between the layers (e.g., between the substrate interface layer and the substrate, between the inner layer (1)

and the substrate interface layer, ... between the inner layer (n) and the inner layer (n−1), between the surface layer and the inner layer (n) and between air and the surface layer when the xth inner layer is an inner layer (x)). On the other hand, in the transparent film of the present invention, the interface roughness between the layers tend to become uniform. It is considered that the interface roughness between the layers correlates to a change in density in the thickness direction, and in the transparent film of the present invention, the thickness is adjusted within the predetermined range, and the regularity of the arrangement of the hydrocarbon chain-containing groups, and the spacer moieties is improved. It results in the uniformity improvements in the thickness direction, and therefore the difference in the interface roughness between the layers becomes small. It is considered that the hardness of the transparent film may be improved while maintaining the water/oil repellency function of hydrocarbon chain-containing groups because of the recular arrangement of the hydrocarbon chain-containing groups and spacer moieties.

Specifically, in the transparent film of the present invention, the thickness is adjusted to be within the above-mentioned range (not less than 6 nm and not more than 50 nm), and uniformity in the thickness direction becomes favorable by adjusting the thickness within this range. It is considered that the transparent film of the present invention attains both water/oil repellency and high hardness due to the uniformity in the thickness direction. Uniformity in the thickness direction can be expressed by a difference in interface roughness, and uniformity in the thickness direction is favorable as the difference in interface roughness among the interfaces decreases.

For this reason, in the transparent film of the present invention, the difference between the maximum value and the minimum value of the interface roughness between the layers is preferably not less than 0.0 nm and not more than 14.5 nm, more preferably not less than 0.0 nm and not more than 8.0 nm, further preferably not less than 0.0 nm and not more than 5.0 nm, especially preferably not less than 0.0 nm and not more than 2.0 nm.

The interface roughness can be determined by measurement using an X-ray reflectivity method. The X-ray reflectivity method is a technique in which the dependency of the reflection X-ray intensity profile on the X-ray incident angle to a multilayer thin-film sample is combined with a simulation result to evaluate properties. For example, for a sample in which the thin-film/thin-film interface is flat, the reflection X-ray intensity is theoretically attenuated in inverse proportion to the fourth power of the X-ray incident angle θ to the sample, and in the case where the thin-film/thin-film interface is not flat, the reflection X-ray intensity is further drastically attenuated. In the X-ray reflectivity method, this feature can be utilized to nondestructively determine a surface of a substance and an internal structure in a depth direction of a thin-film. Specifically, when the laminate is a multilayer film, the intensity of a reflection X-ray is oscillated and changes depending on the incident angle by an interference effect of an X-ray reflected at a surface or a multilayer film interface. In the X-ray reflectivity method, the dependency of the X-ray reflectivity on incidence can be analyzed to nondestructively determine the thickness and density of each layer of a surface multilayer film, and interface roughness (surface roughness/interface roughness). However, there is not necessarily a visible boundary between the vicinity of an interface and other area.

Further, in the transparent film of the present invention, it is especially preferable that the carbon number of the first hydrocarbon chain-containing group is not less than 8 and not more than 10, the amount of silicon atoms, to which the first hydrocarbon chain-containing group is bonded, is not less than 3 mol and not more than 7 mol in 100 mol of silicon atoms contained in the transparent film, and the thickness is not less than 10 nm and not more than 30 nm. The kind and content of the first hydrocarbon chain-containing group, and the thickness of the transparent film are adjusted as described above, so that both hardness and water/oil repellency can be highly attained.

The transparent film of the present invention is excellent in hardness because it is adjusted to have a specific thickness. The hardness of the transparent film of the present invention can be evaluated on the basis of, for example, pencil hardness, and is preferably greater than or equal to 2H, more preferably greater than or equal to 4H, further preferably greater than or equal to 7H, and is normally preferably not greater than 9H. The pencil hardness is the pencil hardness obtained by making a measurement with a transparent film formed on a glass substrate.

In the transparent film of the present invention, the first hydrocarbon chain-containing group is bonded to a part of polysiloxane bonds, and therefore the transparent film is excellent in liquid droplet slide behavior, and thus excellent in water/oil repellency. The liquid droplet slide behavior can be evaluated by, for example, an evaluation method with an a contact angle hysteresis in measurement by a slide falling method as an index, and in the transparent film of the present invention, the contact angle hysteresis to water measured by a slide falling method is preferably not more than 6.0°, more preferably not more than 5.0°, further preferably not more than 4.0°, and is normally preferably not less than 1.0°.

The transparent film of the present invention is normally formed on a substrate, and a substrate comprising the transparent film of the present invention formed on a substrate is encompassed in the scope of the present invention. The substrate may be in the form of a flat surface or a curved surface, or may have a three-dimensional structure in which a large number of surfaces are combined. The substrate may be formed of an organic material or an inorganic material. Examples of the organic material include thermoplastic resins such as acrylic resin, polycarbonate resin, polyester resin, styrene resin, acryl-styrene copolymer resin, cellulose resin, polyolefin resin and polyvinyl alcohol resin; and thermosetting resins such as phenol resin, urea resin, melamine resin, epoxy resin, unsaturated polyester, silicone resin and urethane resin. Examples of the inorganic material include ceramics; glass; metals such as iron, silicon, copper, zinc and aluminum; and alloys including the above metals.

The base material may be subjected to an easy adhesion treatment beforehand. Examples of the adhesion treatments include hydrophilization treatments such as a corona treatment, a plasma treatment and an ultraviolet-ray treatment. A primer treatment with a resin, a silane coupling agent, a tetraalkoxysilane or the like may also be employed. By providing a primer layer between a water-repellent film, and a substrate by the primer treatment, durability such as moisture resistance and alkali resistance can be further improved.

The primer layer is preferably a layer formed using an under-layer forming composition containing a component (P) capable of forming a siloxane backbone.

The primer layer is preferably a layer formed using an under-layer forming composition containing a component (P1) composed of a compound represented by the following formula (III), and/or a partial hydrolysis condensation product thereof.

$$Si(X^{P2})_4 \tag{III}$$

In the formula (III), $X^{P2}$ each independently represent a halogen atom, an alkoxy group or an isocyanate group.

In the formula (III), $X^{P2}$ is preferably a chlorine atom, an alkoxy group with a carbon atom number of 1 to 4, or isocyanate group, and four $X^{P2}$s are preferably the same.

Specifically, $Si(NCO)_4$, $Si(OCH_3)_4$, $Si(OC_2H_5)_4$ or the like is preferably used as the compound represented by the general formula (III) (hereinafter, sometimes referred to as a compound (III)). In the present invention, the compounds (III) may be used singly, or used in combination of two or more thereof.

The component (P1) contained in the primer layer forming composition may be a partial hydrolysis condensation product of one compound (III). The partial hydrolysis condensation product of the compound (III) can be obtained by applying a general hydrolysis condensation method using an acid or base catalyst. The degree of condensation (degree of polymerization) of the partial hydrolysis condensation product is required to be a degree which allows a product to be dissolved in a solvent. The component (P1) may be the compound (III), or a partial hydrolysis condensation product of the compound (III), or may be a mixture of the compound (III) and a partial hydrolysis condensation thereof, for example, a partial hydrolysis condensation product of one compound (III) containing an unreacted part of the compound (III). As the compound represented by the general formula (III) or the partial hydrolysis condensation product, a commercial product is available, and such a commercial product can be used in the present invention.

The under-layer forming composition may be a composition containing the component (P1), and a component (P2) composed of a compound represented by the following formula (IV) (hereinafter, referred to as a compound (IV)) and/or a partial hydrolysis condensation product thereof, or a composition containing a partial hydrolysis co-condensation product of the component (P1) and component (P2) (which may contain the component (P1) and/or the compound (IV)).

$X^{P3}{}_3Si\text{—}(CH_2)_p\text{—}SiX^{P3}{}_3$     (IV)

In the formula (IV), $X^{P3}$ each independently represent a hydrolyzable group or a hydroxyl group, and p is an integer of 1 to 8.

The compound (IV) is a compound having a hydrolyzable silyl group or silanol group at both ends of a divalent organic group.

Examples of the hydrolyzable group represented by $X^{P3}$ in the formula (IV) include the same group or atom as $X^{P2}$. $X^{P3}$ is preferably an alkoxy group or isocyanate group, especially preferably an alkoxy group from the viewpoint of stability of the compound (IV) and ease of hydrolysis. The alkoxy group is preferably an alkoxy group with a carbon atom number of 1 to 4, more preferably methoxy group or ethoxy group. These groups are appropriately selected according to the purpose, use and the like in production. A plurality of $X^{P3}$ existing in the compound (IV) may be the same or different, and is preferably the same from the viewpoint of easy availability.

Specific examples of the compound (IV) include $(CH_3O)_3SiCH_2CH_2Si(OCH_3)_3$, $(OCN)_3SiCH_2CH_2Si(NCO)_3$, $Cl_3SiCH_2CH_2SiCl_3$, $(CH_2H_5O)_3SiCH_2CH_2Si(OC_2H_5)_3$, $(CH_3O)_3SiCH_2CH_2CH_2CH_2CH_2CH_2Si(OCH_3)_3$, or the like. In the present invention, the compounds (IV) may be used singly, or used in combination of two or more thereof.

The component contained in the primer layer forming composition may be a partial hydrolysis condensation product of the compound (IV). The partial hydrolysis condensation product of the compound (IV) can be obtained by the same method as described in the production of the partial hydrolysis condensation product of the compound (III). The degree of condensation (degree of polymerization) of the partial hydrolysis condensation product is required to be a degree which allows a product to be dissolved in a solvent. The component (P) may be the compound (IV), or the partial hydrolysis condensation product of the compound (III), or may be a mixture of the compound (IV) and a partial hydrolysis condensation thereof, for example a partial hydrolysis condensation product of the compound (IV) containing an unreacted part of the compound (IV).

As the compound represented by the general formula (IV) or the partial hydrolysis condensation product, a commercial product is available, and such a commercial product can be used in the present invention.

For the under-layer, various kinds of polysilazanes capable of forming an oxide film mainly composed of silicon, which is similar to the compound (III), may be used.

The primer layer forming composition normally contains an organic solvent in addition to a solid as a layer forming component in consideration of economic efficiency, workability and ease of controlling the thickness of the obtained primer layer. The organic solvent is not particularly limited as long as it is capable of dissolving a solid contained in the primer layer forming composition. Examples of the organic solvent include the same compounds as in the water-repellent film forming composition. The organic solvent is not limited to one kind of solvent, and two or more solvents different in polarity, vaporization rate and so on may be mixed and used.

When the primer layer forming composition contains a partial hydrolysis condensation product and a partial hydrolysis co-condensation product, the primer layer forming composition may contain a solvent used for producing these condensation products.

Further, it is preferable that for accelerating a hydrolysis co-condensation reaction, a catalyst such as an acid catalyst which is similar to one that is generally used in a partial hydrolysis condensation reaction is blended even in a primer layer forming composition which does not contain a partial hydrolysis condensation product and a partial hydrolysis co-condensation product. In the case where the primer layer forming composition contains a partial hydrolysis condensation product and a partial hydrolysis co-condensation product, a catalyst is preferably blended when a catalyst used in these condensation products does not remain in the composition.

The under-layer forming composition may contain water for carrying out a hydrolysis condensation reaction and hydrolysis co-condensation reaction of the contained component.

As a method for forming an under-layer using the primer layer forming composition, a known method with an organosilane compound-based surface treatment agent can be used. For example, the under-layer forming composition can be applied to a surface of a base by a method such as brush coating, flow coating, rotation coating, immersion coating, squeeze coating, spray coating or hand coating, dried as necessary in the air or a nitrogen atmosphere, and then cured to form the under-layer. Conditions for curing are appropriately controlled according to the kind, concentration and the like of a composition to be used.

Curing of the primer layer forming composition may be performed concurrently with curing of a water-repellent film forming composition.

The thickness of the primer layer is not particularly limited as long as it ensures that moisture resistance, adhesion, and barrier property to an alkali etc. from the substrate can be imparted to a water-repellent film formed on the primer layer.

The transparent film of the present invention attains both water/oil repellency and hardness, and is useful as a base material in display devices such as touch panel displays, optical elements, semiconductor elements, building materials, automobile components, nanoimprint techniques, solar cell members and so on. The transparent film of the present invention is suitably used for articles such as bodies, window glass (windshield, side glass and rear glass), mirrors and bumpers in transportation equipment such as trains, automobiles, watercrafts and aircrafts. The transparent film can also be used in outdoor applications such as building outer walls, tents, solar cell power generation modules, sound insulating boards and concrete. The transparent film can also be used in fishing nets, bug catching nets and water tanks. Further, the transparent film can also be used in various kinds of indoor equipment such as articles of members around kitchens, bathrooms, washbasins, mirrors and toilets, chandeliers, potteries such as tiles, artificial marbles, and air conditioners. Further, the transparent film can also be used for antifouling treatment of tools, inner walls, pipes and so on in factories. The transparent film is also suitable for goggles, glasses, helmets, pinball games, fibers, umbrellas, play equipment, soccer balls and so on. Further, the transparent film can also be used as a deposition preventing agent for various kinds of packaging materials such as food packaging materials, cosmetic packaging materials and interiors of pots.

The present application claims the benefit of priority to Japanese patent application No. 2014-223648 filed on Oct. 31, 2014. The entire contents of the specification of Japanese patent application No. 2014-223648 filed on Oct. 31, 2014 are incorporated herein by reference.

EXAMPLES

The present invention is hereinafter described in more detail in the following by way of Examples, however, the present invention is not limited to the following Examples, and modifications which do not depart from the spirit and scope of the present invention are allowed and embraced within the technical scope of the present invention. Hereinafter, "part" and mean "part by mass" and "% by mass", respectively, unless otherwise noted.

Measurement methods used in examples of the present invention are as follows.

Measurement of Water/Oil Repellency

The dynamic water/oil repellency characteristic (contact angle hysteresis) of a transparent film surface to water was measured by a slide falling method (analysis method: contact method, liquid amount; 6.0 μL, inclination method: continuous inclination, slide falling detection: after slide falling, movement determination: angle of advance, slide falling determination distance: 0.125 mm) using DM 700 manufactured by Kyowa Interface Science Co., LTD.

Measurement of Hardness

The pencil hardness of the transparent film was measured in accordance with a pencil hardness test specified in JIS K5600-5-4:1999 "Testing methods for paints-Part 5: Mechanical property of film-Section 4: Scratch hardness {Pencil method}".

Measurement of Thickness

The thickness of the transparent film was measured using a contact-type thickness meter (VertScan manufactured by Ryoka Systems Inc.).

Measurement of Contact Angle

The contact angle of a transparent film surface to water was measured by a liquid droplet method (analysis method: θ/2 method, liquid amount: 3.0 μL) using DM 700 manufactured by Kyowa Interface Science Co., LTD.

Measurement of Interface Roughness

For the measurement, an X-ray reflectivity measurement apparatus (SmartLab) manufactured by Rigaku Corporation was used. The obtained reflectivity profile was analyzed by analysis software (GlobalFit) from Rigaku Corporation to determine the interface roughness. Conditions for measurement by an X-ray reflectivity method were optimized so that the thickness measured by the contact-type thickness meter was consistent with the thickness measured by the X-ray reflectivity method.

Measurement conditions for the transparent films of Examples 6 and 7 are as follows.
Tube voltage: 45 kV
Tube current: 200 mA
Incident X-ray wavelength: 0.15413 nm (CuKα ray)
Incident monochromater: none
Angular sampling width: 0.01°
Angular scanning range: 0.0 to 2.5°

Measurement conditions for the transparent films of Comparative Examples 7 and 8 are as follows.
Tube voltage: 45 kV
Tube current: 200 mA
Incident X-ray wavelength: 0.15406 nm (Cukα$_1$ ray)
Incident monochromater: Ge(220) monochrome crystal
Angular sampling width: 0.002°
Angular scanning range: 0.0 to 1.6°

Example 1

Sixty-six parts of ethanol as a solvent and 48 parts of hydrochloric acid (0.01 M aqueous solution) as a catalyst were mixed with 2.5 parts (0.01 parts by mol) of hexyltriethoxysilane as an organosilicon compound (A) and 33.3 parts (0.16 parts by mol) of tetraethyl orthosilicate (tetraethoxysilane), and the mixture was stirred at room temperature for 24 hours to obtain a mixed liquid. The obtained mixture liquid was diluted with ethanol at a dilution ratio of 10 (diluted in terms of a volume; 1210 parts), and stirred at room temperature for 30 minutes. The obtained diluted liquid was applied onto a glass substrate ("EAGLE XG" manufactured by Corning Incorporated) by spin coating under the condition of a rotation number of 3000 rpm and 20 sec using a spin coater manufactured by MIKASA Corporation, and then dried to obtain a transparent film.

Examples 2 to 5 and Comparative Examples 1 to 6

A transparent film was obtained in the same procedure as in Example 1 except that the kinds and use amounts of the organosilicon compound (A) and the metal compound (B) were as shown in Table 1, and the dilution ratio of the solvent was as shown in Table 1.

In Comparative Example 6, a fluorine compound (OP-TOOL DSX-E, Novec 7200) was used in place of the organosilicon compound (A) and the metal compound (B).

The contact angle to water, the thickness, the pencil hardness and the liquid droplet slide behavior for each of the obtained transparent films are shown in Table 1.

TABLE 1

| | | | | | | Examples | | | | | Comparative Examples | | | | | |
|---|---|---|---|---|---|---|---|---|---|---|---|---|---|---|---|---|
| | | | | | | 1 | 2 | 3 | 4 | 5 | 1 | 2 | 3 | 4 | 5 | 6 |
| Film pro-duction | Com-ponent | Organo-silicon compound (A) | Hexyltriethoxysilane (248.43 g/mol) | Parts by mol | 0.01 | | | | | 0.01 | | | | | |
| | | | | Parts | 2.5 | | | | | 2.5 | | | | | |
| | | | Octyltriethoxysilane (276.49 g/mol) | Parts by mol | | 0.01 | 0.01 | 0.01 | | | 0.01 | 0.01 | 0.01 | | |
| | | | | Parts | | 2.8 | 2.8 | 2.8 | | | 2.8 | 2.8 | 2.8 | | |
| | | | Decyltriethoxysilane (304.54 g/mol) | Parts by mol | | | | | 0.01 | | | | | 0.01 | |
| | | | | Parts | | | | | 3.0 | | | | | 3.0 | |
| | | Metal compound (B) | Tetraethoxysilane (208.33 g/mol) | Parts by mol | 0.16 | 0.08 | 0.20 | 0.28 | 0.19 | 0.16 | 0.08 | 0.20 | 0.28 | 0.19 | |
| | | | | Parts | 33.3 | 16.7 | 41.7 | 58.3 | 39.0 | 33.3 | 16.7 | 41.7 | 58.3 | 39.0 | |
| | | Fluorine compound | OPTOOL DXS-E | Parts | | | | | | | | | | | 0.1 |
| | | | Novex 7200 | Parts | | | | | | | | | | | 19.9 |
| | | Solvent (1) | Ethanol | Parts | 66 | 37.9 | 83.7 | 118.5 | 81.4 | 66 | 37.9 | 83.7 | 118.5 | 81.4 | |
| | | Catalyst | 0.01 mol/L Hydrochloric acid | Parts | 48 | 24.0 | 60 | 82 | 55 | 48 | 24.0 | 60 | 82 | 55 | |
| | | Solvent (2) | Ethanol | Ratio | 10 | 10 | 8 | 10 | 10 | | | | | | |
| | | | | Parts | 1210 | 660 | 1180 | 2113 | 1442 | | | | | | |
| Physical property | | Contact angle (water) | | — | 93.8 | 101.1 | 100.7 | 97.0 | 105.3 | 102.9 | 107 | 107.0 | 106.4 | 109.1 | 112.9 |
| | | Thickness | | nm | 21.3 | 30 | 20.6 | 14 | 23.0 | 162 | 225 | 165 | 162 | 280 | 8 |
| | | Pencil hardness | | | 8H | 6H | 6H | 9H | 5H | HB | X | F | HB | X | 9H |
| | | Slip behavior (content angle hysteresis. Water) | | — | 3.7 | 4.8 | 4.4 | 2.8 | 5.1 | 5.2 | 6.9 | 7.6 | 7.4 | 7.1 | 14.6 |

The results described above show that the transparent film of the present invention is capable of attaining both water/oil repellency and hardness.

Examples 6 and 7 and Comparative Examples 7 and 8

A transparent film was obtained in the same procedure as in Example 1 except that the kinds and use amounts of the organosilicon compound (A) and the metal, compound (B) were as shown in Table 2, and the dilution ratio of the solvent was as shown in Table 2. The thickness of each of the obtained transparent films is shown in Table 2.

The results of the x-ray reflectivity measurement showed that the transparent films of examples and comparative examples had three layers. The three layers are defined, respectively, as a substrate interface layer, an inner layer and a surface layer in order from the substrate side, and Table 2 shows the interface roughness between the substrate interface layer and the substrate as a substrate surface, the surface roughness between the inner layer and the substrate interface layer as a substrate interface, the interface roughness between the surface layer and the inner layer as an inner part, and the interface roughness between air and the outermost surface layer as an outermost surface.

TABLE 2

| | | | | | Examples | | Comparative Examples | |
|---|---|---|---|---|---|---|---|---|
| | | | | | 6 | 7 | 7 | 8 |
| Film pro-duction | Com-ponent | Organo-silicon compound (A) | Octyltriethoxysilane (276.49 g/mol) | Parts by mol | 0.01 | | 0.01 | |
| | | | | Parts | 2.8 | | 2.8 | |
| | | | Dodecyltriethoxysilane (332.59 g/mol) | Parts by mol | | 0.01 | | 0.01 |
| | | | | Parts | | 3.3 | | 3.3 |
| | | Metal compound (B) | Tetraethoxysilane (208.33 g/mol) | Parts by mol | 0.20 | 0.16 | 0.20 | 0.16 |
| | | | | Parts | 41.7 | 33.3 | 41.7 | 33.3 |
| | | Solvent (1) | Ethanol | Parts | 83.7 | 48.0 | 83.7 | 48 |
| | | Catalyst | 0.01 mol/L Hydrochloric acid | Parts | 60 | 71 | 60 | 71 |
| | | Solvent (2) | Ethanol | Ratio | 10 | 20 | | |
| | | | | Parts | 1517 | 2660 | | |
| Physical property | Rough-ness | | Thickness | nm | 8 | 13 | 233 | 202 |
| | | | Outermost surface | nm | 0.6 | 0.5 | 0.7 | 0.6 |
| | | | Inner part | nm | 0.4 | 0.5 | 1.4 | 3.8 |
| | | | Substrate interface | nm | 0.2 | 0.5 | 1.9 | 14.9 |
| | | | Substrate surface | nm | 0.7 | 0.8 | 18.2 | 0.2 |

In Example 6, the maximum value of the interface roughness is represented by the interface roughness between the substrate interface layer and the substrate, and is 0.7 nm, and the minimum value of the interface roughness is represented by the interface roughness between the inner layer and the substrate interface layer, and is 0.2 nm. Here, the difference between the maximum value and the minimum value of the interface roughness is 0.7−0.2=0.5 nm.

On the other hand, in Comparative Example 7, the maximum value of the interface roughness is represented by the interface roughness between the substrate interface layer and the substrate, and is 18.2 nm, and the minimum value of the interface roughness is represented by the interface roughness between air and the surface layer, and is 0.7 nm. Here, the difference between the maximum value and the minimum value of the interface roughness is 18.2−0.7=17.5 nm. It is considered that by adjusting the thickness to not less than 6 nm and not more than 50 nm as described above, a film having a small variation in surface roughness and good uniformity in the surface was obtained, and as a results, both water/oil repellency and high hardness was attained.

INDUSTRIAL APPLICABILITY

The transparent film of the present invention attains both water/oil repellence and hardness, and is useful as a base material in display devices such as touch panel displays, optical elements, semiconductor elements, building materials, automobile components, nanoimprint techniques, solar cell members and so on.

The invention claimed is:

1. A transparent film comprising:

a polysiloxane backbone; and a first hydrocarbon chain-containing group bonded to a part of silicon atoms forming the polysiloxane backbone, wherein the first hydrocarbon chain-containing group comprises a chain structure including not less than 6 and not more than 20 carbon atoms, wherein the first hydrocarbon chain-containing group is composed of a hydrocarbon group, wherein the transparent film comprises a structure (A) represented by formula (1) below:

[Chemical Formula 1]

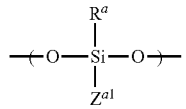

(1)

wherein $R^a$ represents the first hydrocarbon chain-containing group, wherein $Z^{a1}$ represents the first hydrocarbon chain-containing group, a second hydrocarbon chain-containing group or —O— group, wherein $R^a$ and $Z^{a1}$ may be the same or different when $Z^{a1}$ is the first hydrocarbon chain-containing group, and wherein the transparent film comprises a structure (B) represented by formula (2) below:

[Chemical Formula 2]

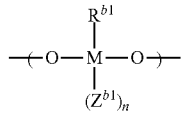

(2)

wherein $R^{b1}$ represents the second hydrocarbon chain-containing group, hydroxy group or —O— group, wherein $Z^{b1}$ represents the second hydrocarbon chain-containing group, hydroxy group or —O— group, wherein $R^{b1}$ and $Z^{b1}$ may be the same or different when each of $Z^{b1}$ and $R^{b1}$ is the second hydrocarbon chain-containing group, wherein M represents Al, Fe, In, Ge, Hf, Si, Ti, Sn, Zr or Ta, and wherein n represents an integer of 0, 1 or 2 according to the kind of M, wherein the transparent film consists of a single embodiment of the structure (A) and a single embodiment of the structure (B), wherein an abundance ratio of the structure (B) to the structure (A) as structure (B)/structure (A) is not less than 8 and not more than 60 in terms of moles, wherein the thickness of the transparent film is not less than 6 nm and not more than 50 nm, wherein the transparent film has a pencil hardness of greater than or equal to 5H, wherein a contact angle hysteresis to water measured by a slide falling method as the dynamic water/oil repellency characteristic is not more than 5.1°.

2. The transparent film according to claim 1, wherein the thickness is not less than 8 nm and not more than 40 nm.

3. A substrate comprising the transparent film according to claim 1 on the substrate.

4. The transparent film according to claim 1, wherein the second hydrocarbon chain-containing group comprises a chain structure having a length shorter than a length of the first hydrocarbon chain-containing group, or a structure in which a part of methylene groups (—$CH_2$—) in the chain structure are replaced by oxygen atoms.

5. The transparent film according to claim 1, wherein M is Si in the formula (2).

6. A transparent film comprising:

a polysiloxane backbone; and a first hydrocarbon chain-containing group bonded to a part of silicon atoms forming the polysiloxane backbone, wherein the first hydrocarbon chain-containing group comprises a chain structure including not less than 6 and not more than 20 carbon atoms, wherein the first hydrocarbon chain-containing group is composed of a hydrocarbon group, wherein the transparent film comprises a structure (A) represented by formula (1) below:

[Chemical Formula 1]

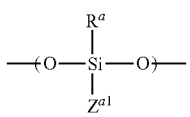

(1)

wherein $R^a$ represents the first hydrocarbon chain-containing group, wherein $Z^{a1}$ represents the first hydrocarbon chain-containing group, a second hydrocarbon chain-containing group or —O— group, wherein the second hydrocarbon chain-containing group is composed of a hydrocarbon group, wherein $R^a$ and $Z^{a1}$ may be the same or different when $Z^{a1}$ is the first hydrocarbon chain-containing group, and wherein $R^a$ and $Z^{a1}$ may be the same or different when the transparent film comprises a plural number of formulae (1), wherein the transparent film comprises a structure (B) represented by formula (2) below:

[Chemical Formula 2]

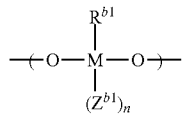

(2)

wherein $R^{b1}$ represents the second hydrocarbon chain-containing group, hydroxy group or —O— group, wherein $Z^{b1}$ represents the second hydrocarbon chain-containing group, hydroxy group or —O— group, wherein $R^{b1}$ and $Z^{b1}$ may be the same or different when each of $Z^{b1}$ and $R^{b1}$ is the second hydrocarbon chain-containing group, wherein $R^{b1}$ and $Z^{b1}$ may be the same or different when the transparent film comprises a plural number of formulae (2), wherein M represents Al, Fe, In, Ge, Hf, Si, Ti, Sn, Zr or Ta, and wherein n represents an integer of 0, 1 or 2 according to the kind of M, wherein the transparent film consists of the structure (A) and the structure (B), wherein an abundance ratio of the structure (B) to the structure (A) as structure (B)/structure (A) is not less than 8 and not more than 60 in terms of moles, wherein the thickness of the transparent film is not less than 6 nm and not more than 50 nm, wherein the transparent film has a pencil hardness of greater than or equal to 5H, wherein a contact angle hysteresis to water measured by a slide falling method as the dynamic water/oil repellency characteristic is not more than 5.1°.

* * * * *